US008159986B2

(12) United States Patent
Yun et al.

(10) Patent No.: US 8,159,986 B2
(45) Date of Patent: Apr. 17, 2012

(54) METHOD FOR PROVIDING MULTICAST BROADCAST SERVICE IN COMMUNICATION SYSTEM

(75) Inventors: Mi-Young Yun, Daejeon (KR); Jung-Mo Moon, Daejeon (KR); Sang-Ho Lee, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 523 days.

(21) Appl. No.: 12/517,350

(22) PCT Filed: Sep. 21, 2007

(86) PCT No.: PCT/KR2007/004688
§ 371 (c)(1),
(2), (4) Date: Jun. 2, 2009

(87) PCT Pub. No.: WO2008/069418
PCT Pub. Date: Jun. 12, 2008

(65) Prior Publication Data
US 2010/0061288 A1 Mar. 11, 2010

(30) Foreign Application Priority Data

Dec. 7, 2006 (KR) ........................ 10-2006-0123927

(51) Int. Cl.
*H04H 20/71* (2008.01)
*H04J 3/06* (2006.01)

(52) U.S. Cl. ........................................ 370/312; 370/350

(58) Field of Classification Search .................. 370/312, 370/328, 338, 350, 390, 432; 455/502, 503, 455/422.1
See application file for complete search history.

(56) References Cited

U.S. PATENT DOCUMENTS

| | | | |
|---|---|---|---|
| 2004/0008646 | A1 | 1/2004 | Park et al. |
| 2006/0146745 | A1 | 7/2006 | Cai et al. |
| 2006/0223520 | A1* | 10/2006 | Laroia et al. ............... 455/422.1 |
| 2007/0025295 | A1* | 2/2007 | Kono ........................... 370/331 |
| 2007/0099639 | A1* | 5/2007 | Mege et al. ................... 455/502 |
| 2007/0230351 | A1 | 10/2007 | Dang |
| 2008/0037480 | A1* | 2/2008 | Venkatachalam ............. 370/338 |
| 2008/0070572 | A1* | 3/2008 | Shkedi ........................ 455/435.1 |
| 2009/0046637 | A1 | 2/2009 | Kim et al. |

FOREIGN PATENT DOCUMENTS

| | | |
|---|---|---|
| KR | 10-2002-0071111 A | 9/2002 |
| KR | 10-2003-0008681 A | 1/2003 |
| KR | 10-2006-0091132 A | 8/2006 |
| WO | 2006/047941 A1 | 5/2006 |
| WO | 2006-085732 A1 | 8/2006 |

* cited by examiner

*Primary Examiner* — Brian Nguyen

(74) *Attorney, Agent, or Firm* — Jefferson IP Law, LLP

(57) ABSTRACT

In a communication system, a plurality of radio access systems (RASs) respectively receives connection resources from an MBS server for transmitting a multicast broadcast data packet. The MBS server is involved in transmission of the multicast broadcast data packet. Then, the plurality of RASs receive the multicast broadcast data packet including parameters for synchronization between the plurality of RASs and parameters for size and location of the multicast broadcast data packet and deliver the received multicast broadcast data packet to a portable subscriber station (PSS). Thereby, the plurality of RASs can transmit the multicast broadcast data packets with the same location and the same size to the PSSs at the same time.

16 Claims, 7 Drawing Sheets

[Fig. 1]
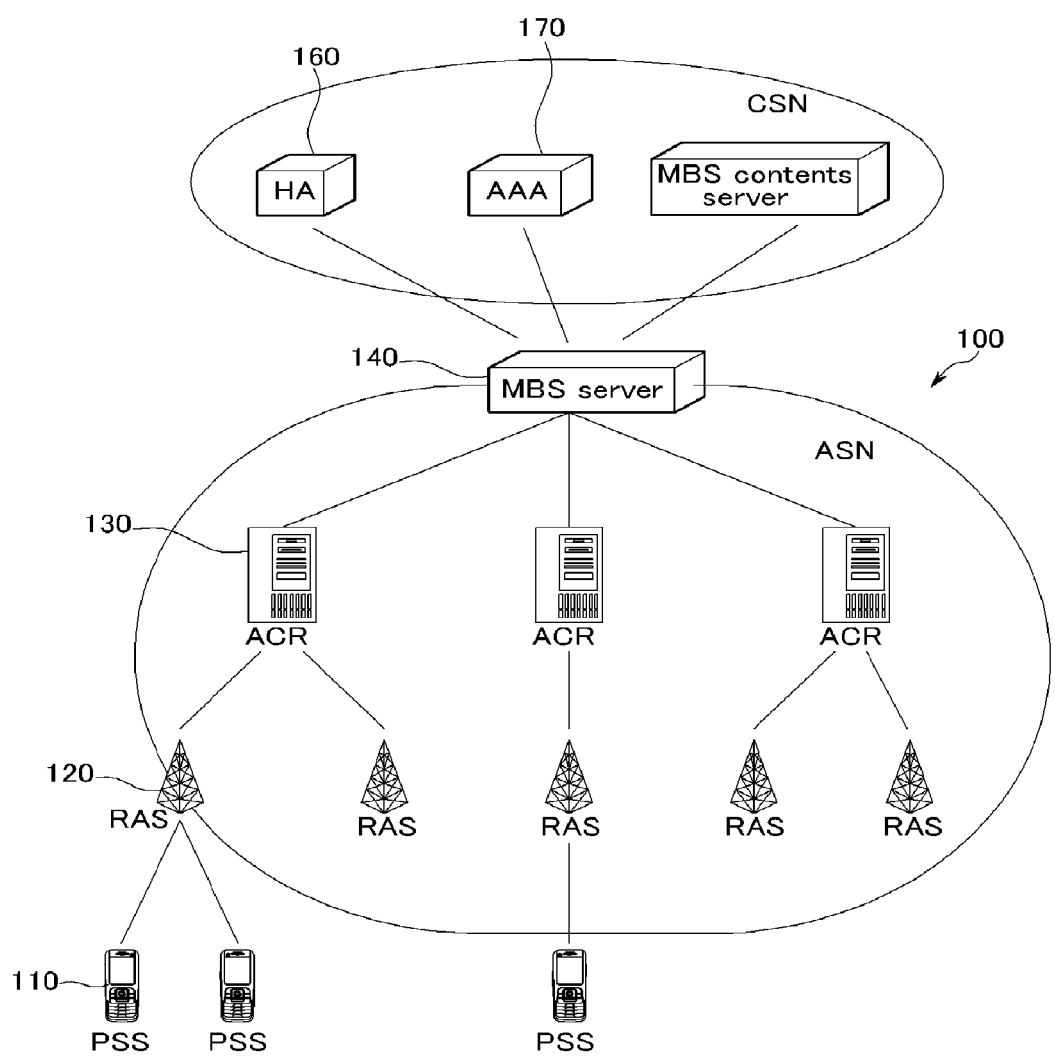

[Fig. 2]
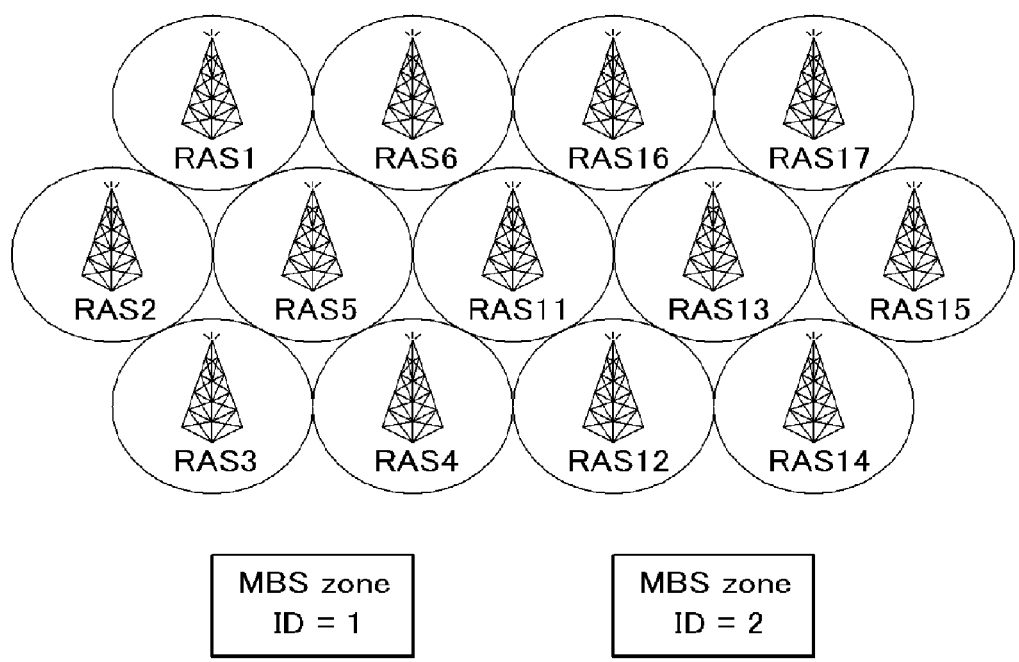

[Fig. 3]
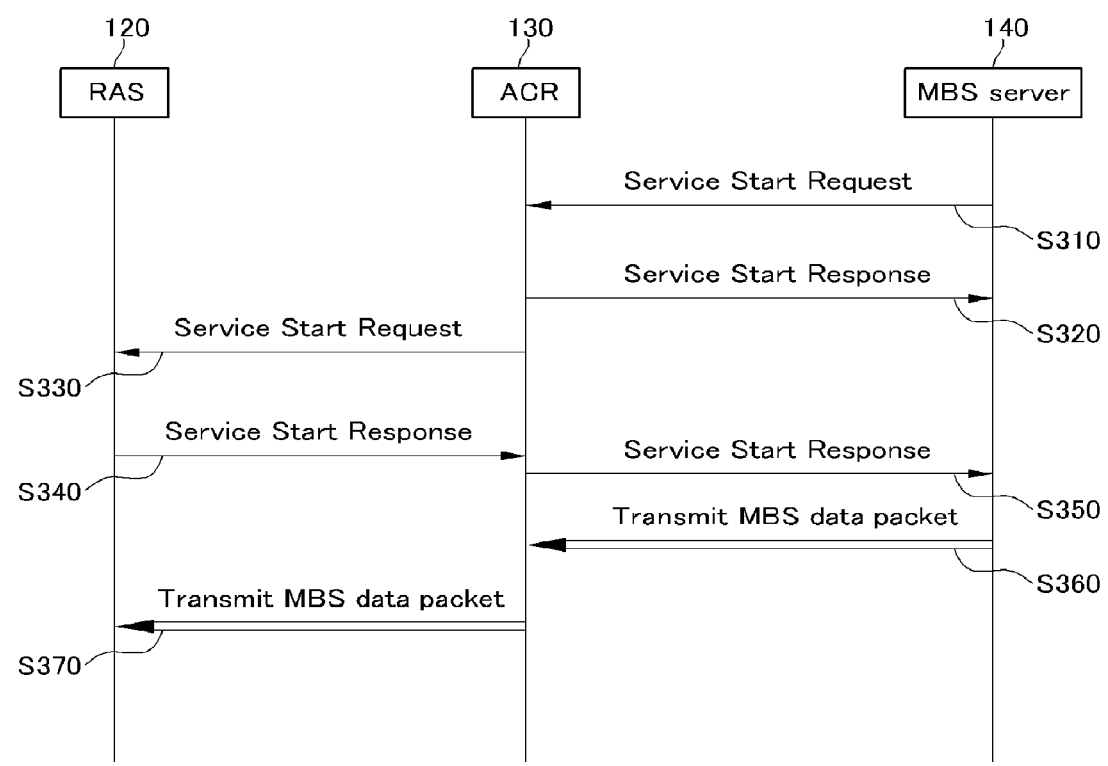

[Fig. 4]
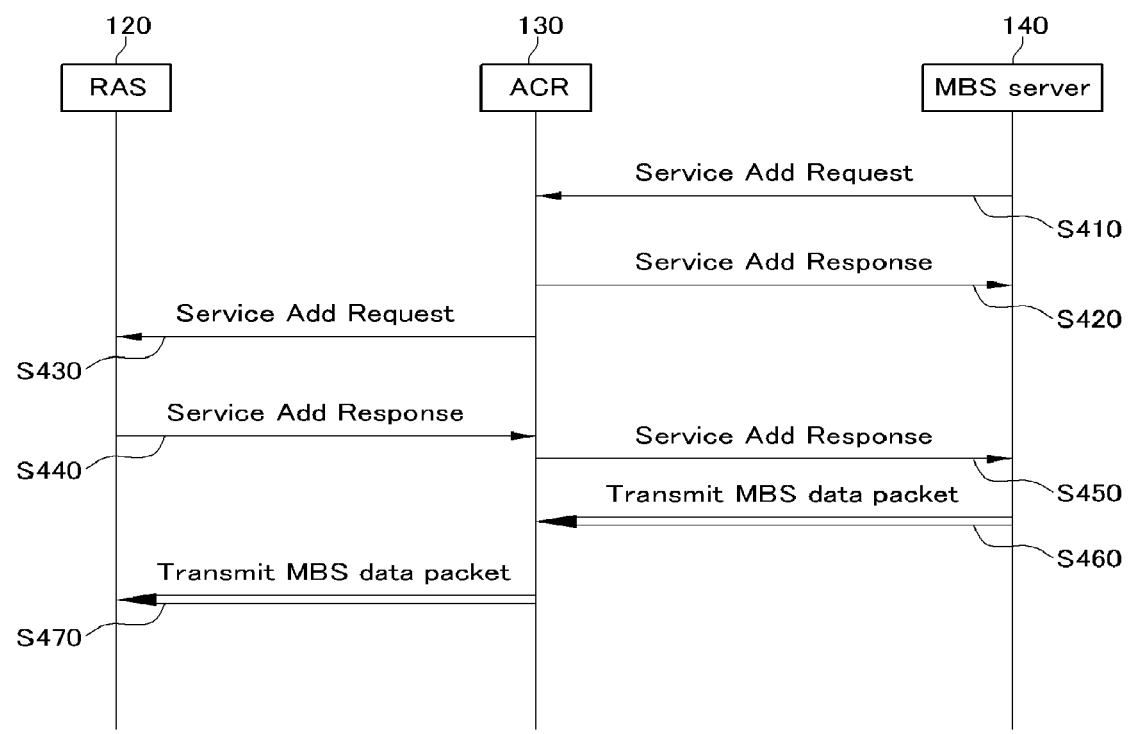

[Fig. 5]
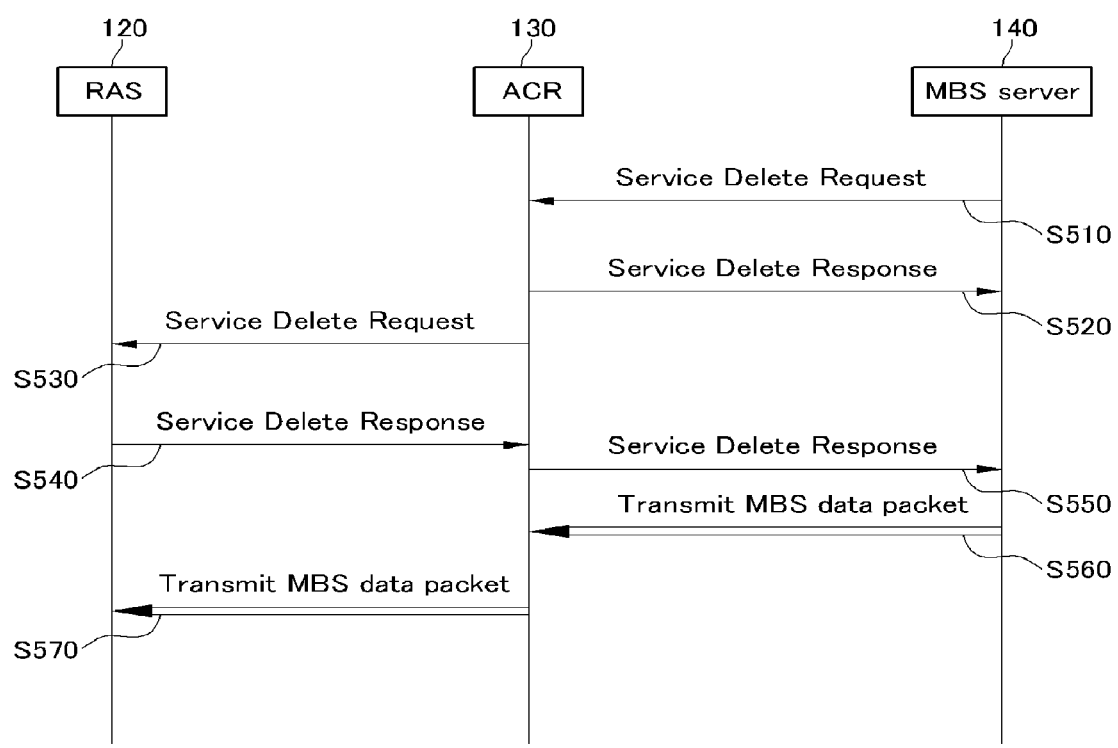

[Fig. 6]
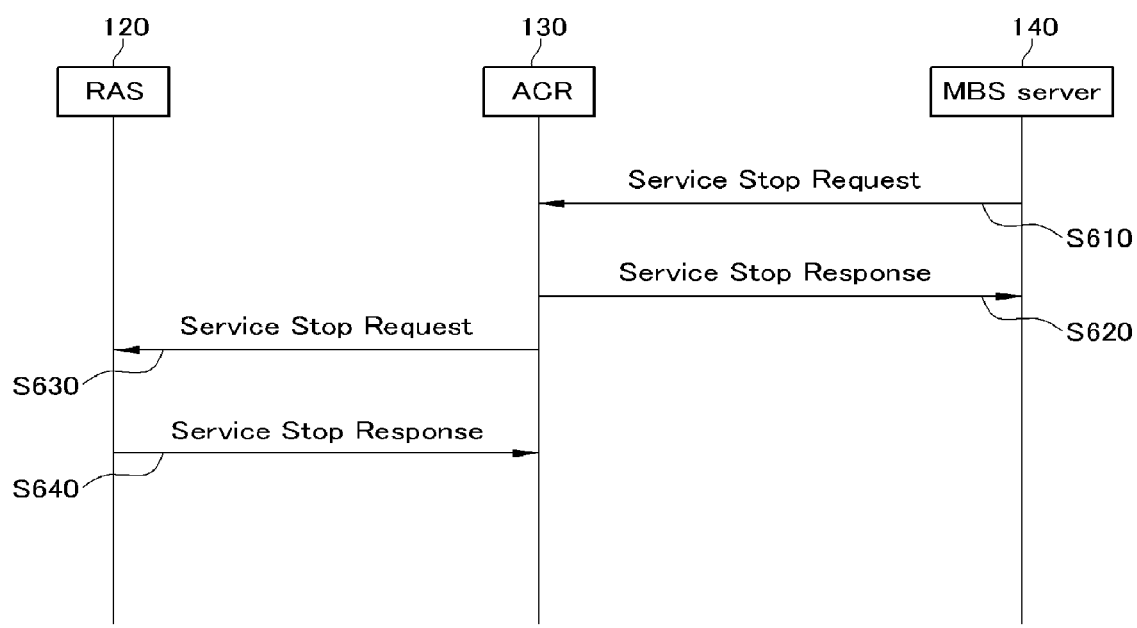

[Fig. 7]
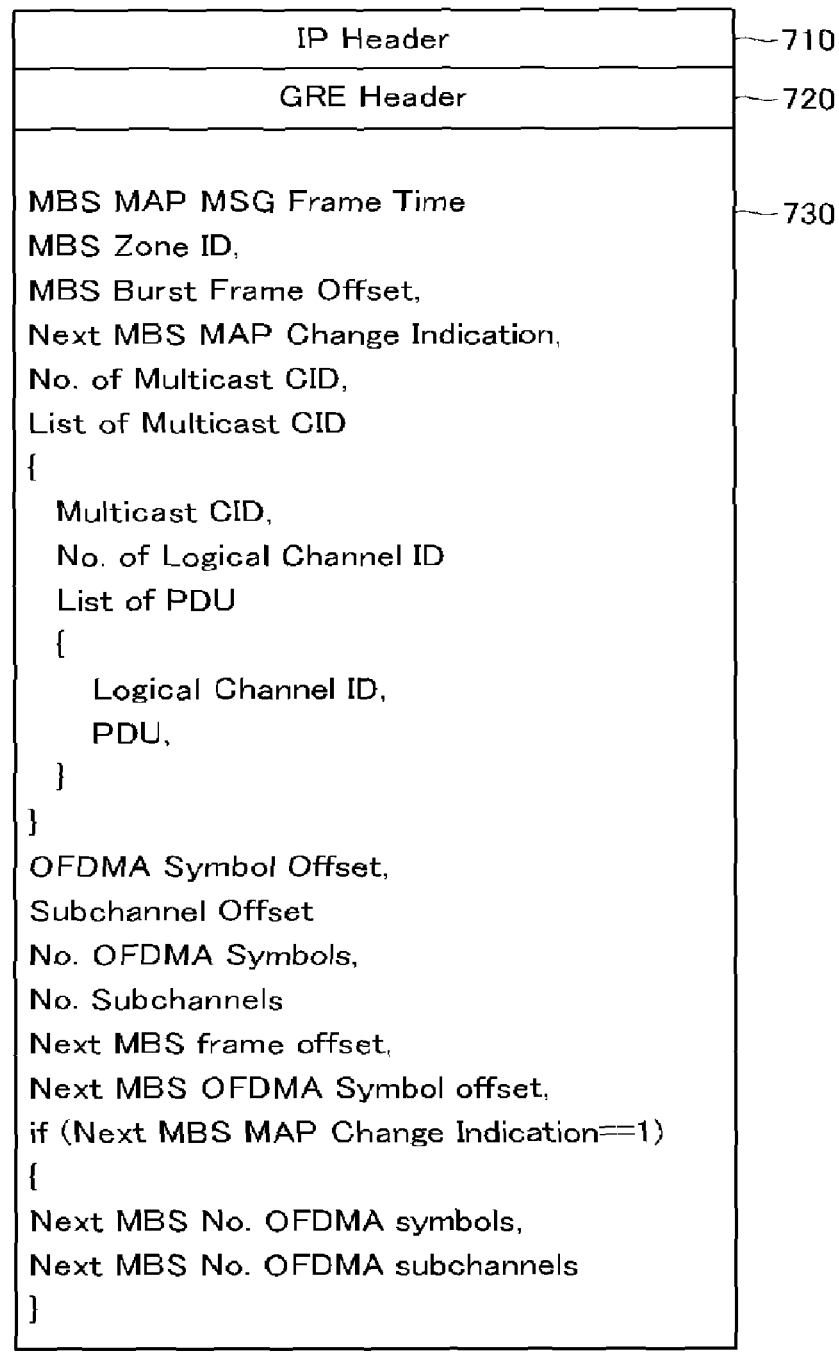

METHOD FOR PROVIDING MULTICAST BROADCAST SERVICE IN COMMUNICATION SYSTEM

TECHNICAL FIELD

The present invention relates to a method for providing a multicast broadcast service in a communication system.

BACKGROUND ART

Since it is expected that the use of a point-to-multipoint service (i.e., multicast broadcast service, MBS) that provides the same information to a plurality of users through one link is increased in a wireless network, a method for efficiently supporting the MBS is required. Particularly, the plurality of users receiving the information must have the same complementary relationship with the same connection parameters. In a wideband wireless access communication system, a plurality of portable subscriber stations (PSSs) included in a cell share a connection ID (CID) that is an identifier of a packet transmitted through a radio link so that the plurality of PSSs can receive the same information from one radio access system (RAS).

The MBS is established only through a downlink, and can be divided into a single access method and a multiple access method. The single access method is a method for transmitting a packet from a single RAS to a PSS, and the multiple access method is a method for simultaneously transmitting the same packets from a plurality of RASs to the PSS. According to the multiple access method, the PSS receives the same packets from the plurality of RASs, and therefore the PSS can receive an accurate packet by merging the received packets. In this case, in order to transmit the same packets, the plurality of RASs must insert packets of the same size in the same location in a downlink frame and apply the same coding method, and synchronization between the plurality of RASs is required. However, a method for efficiently supporting the above requirements has not been proposed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method having an advantage of efficiently providing a multicast broadcast service (MBS) by using a multiple access method in a communication system.

Technical Solution

An exemplary service providing method according to one embodiment of the present invention provides a plurality of radio access systems (RASs) with a method for providing a multicast broadcast service (MBS) from an MBS server to a portable subscriber station (PSS) in a communication system. The service providing method includes: processing a signal for establishing a bearer with the MBS server; receiving a multicast broadcast data packet from the MBS server, the multicast broadcast data packet including information for synchronization of the respective RASs and broadcast data; and transmitting the multicast broadcast data packet to the PSS by using the synchronization information.

An exemplary method according to another embodiment of the present invention is provided to an MBS server for providing an MBS to a plurality of RASs in a communication system. The method includes allocating connection resources for transmitting multicast broadcast data packets to the plurality of RASs and providing the multicast broadcast data packets, each including synchronization information between the plurality of RASs.

An exemplary method according to another embodiment of the present invention is provided to an MBS server for providing an MBS to a plurality of RASs in a communication system. The method includes: dividing the plurality of RAS into a plurality of groups according to locations; allocating identifiers (IDs) for the respective groups and connection resources to the plurality of RASs for transmitting multicast broadcast data packets to the plurality of RASs; and providing multicast broadcast data packets including synchronization information between RASs in each group to the plurality of RASs.

Advantageous Effects

As described, according to the exemplary embodiments of the present invention, a plurality of RASs concurrently transmit the same MBS data packets to a PSS based on size and location information of data in the MBC data packet.

Furthermore, according to the exemplary embodiments of the present invention, when a plurality of RASs transmit MBS data packets to a PSS in the multiple access method, the MBS data packets can be synchronized so that a macro diversity effect can be achieved, thereby guaranteeing more stable data transmission.

BRIEF DESCRIPTION OF THE DRAWINGS

FIG. 1 shows a wideband wireless access communication system according to an exemplary embodiment of the present invention.

FIG. 2 shows a multicasting broadcast service (MBS) zone.

FIG. 3 to FIG. 6 respectively show a process for providing an MBS in a communication system according to first to fourth exemplary embodiments of the present invention.

FIG. 7 shows a configuration of an MBS data packet.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise" and variations such as "comprises" or "comprising" will be understood to imply the inclusion of stated elements but not the exclusion of any other elements. In addition, in the specification, a term "block" means one unit for processing a specified function or operation, and may be realized by means of hardware, software, or a combination of hardware and software.

A multicast broadcast service providing method in a communication system according to an exemplary embodiment of the present invention will now be described in accordance with the accompanying drawings. Although the exemplary embodiment of the present invention is applied to a wideband wireless access communication system, the exemplary embodiment can be applied to another communication system.

FIG. 1 shows a wideband wireless access communication system according to the exemplary embodiment of the present invention, and FIG. 2 shows a multicasting broadcast service (MBS) zone.

As shown in FIG. 1, the wideband wireless access communication system includes a portable subscriber station (PSS) 110, a radio access system (RAS) 120, an access control router (ACR) 130, an MBS server 140, an MBS contents server 150, a home agent (HA) 160, and an authentication, authorization, and accounting (AAA) server 170.

The PSS 110 refers to a mobile communication terminal.

The RAS 120 wirelessly accesses the PSS 110 and accesses the ACR 130 through a wire, and receives a radio signal from the PSS 110 and delivers the radio signal to the ACR 130 or converts signals received from the ACR 130 into radio signals and delivers the radio signals to the PSS 110. In this case, MBS contents provided from the MBS contents server 150 are transmitted/received between the PSS 110 and the RAS 120. The MBS data packet includes an MBS data burst, synchronization information, size and location information of MBS data burst. Accordingly, RAS 120 can concurrently transmit the same MBS data packets with the same location and the same size to the PSSs based on size and location information. Herein, as shown in FIG. 2, at least one of RASs RAS1 to RAS6 and RAS11 to RAS17 may be included in one logical group according to its location for distinguishing a broadcast service delay. The logical group is called an MBS zone. That is, the RASs RAS1 to RAS6 form one MBS zone having an MBS zone identifier (ID) of "1". In addition, the RASs RAS11 to RAS17 form another MBS zone having an MBS zone ID of "2". The respective RASs RAS1 to RAS6 and RAS11 to RAS17 included in each of the MBS zone multicast or broadcast the same broadcast data to the PSSs 110 at the same time using the same frequency band, and PSSs 110 located in each MBS zone receive the broadcast data in the same way.

Referring back to FIG. 1, the ACR 130 has a hierarchical structure for managing a plurality of RASs 120 in a centralized manner and controlling the plurality of RASs 120 through wires.

The MBS server 140 manages the MBS zones, and transmits MBS data packet provided from the MBS contents server 150, to the RAS 120 through the ACR 130.

The MBS contents server 150 provides MBS data packets to the MBS server 140.

The HA 160 provides Internet protocol (IP) mobility, and the AAA server 170 performs user authentication.

In such a wideband wireless access communication system, the RAS 120, the ACR 130, and the MBS server 140 are located in an access service network (ASN), and the MBS contents server 150 may be located in a core service network (CSN). Unlike as shown in FIG. 1, the MBS server 140 may be included in the ACR 130. When the MBS server 140 is located in the ACR 130, the size of an MBS zone may be limited to one ACR 130.

A multiple access method applied to the exemplary embodiment of the present invention refers to a broadcast service that is performed in an MBS zone including a plurality of RASs 120. In this case, for the broadcast service in the MBS zone, the same broadcast data burst is located and transmitted on the same regions in frequency-time domains of downlink frames transmitted by all the RASs 120 (RAS1 to RAS6 or RAS11 to RAS17 of FIG. 2) in the MBS zone, and a multicast CID used for connection of each MBS data burst, i.e., MBS service, is also allocated with the same value. Herein, the MBS data burst is distinguished by a multicast CID and a logical channel ID, and one multicast CID can be mapped to a plurality of logical channel IDs. The multicast CID is used for multicasting the MBS data packet, and the PSS 110 uses the multicast CID to identify an MBS connection with the RAS 120 from other connections. In addition, the logical channel ID is used for identifying a logical MBS connection included in the same multicast CID.

This means that all RASs (RAS1 to RAS6 or RAS11 to RAS17 of FIG. 2) in the MBS zone provide the same broadcast service in the same way. For example, for a CID B allocated to a broadcast service A multicast by a first RAS (e.g., RAS1 of FIG. 2), the broadcast service A may exist even in a second RAS (RAS2 in FIG. 2) in the same MBS zone, and a CID allocated to the broadcast service is equal to the CID B used in the first RAS. In addition, an MBS zone in a downlink frame for transmitting actual data of the broadcast service A has the same location, the same size, and the same time band in the downlink frame regions from all RASs (RAS1 to RAS6 or RAS11 to RAS17 of FIG. 2). Therefore, a physical macro diversity effect for a signal can be achieved.

FIG. 3 shows a process for providing an MBS in a communication system according to a first exemplary embodiment of the present invention.

As shown in FIG. 3, the MBS server 140 transmits a service start request message to the ACR 130 for each MBS data burst so as to establish a bearer between the MBS server 140 and the ACR 130 and between the RAS 120 and the ACR 130 before transmitting an MBS data packet, in step S310. At this time, the service start request message includes an MBS zone ID, a GTP Tunnel ID to be used for transmitting/receiving the MBS data packet to/from another node, coding information to be used for the corresponding MBS data burst, multicast CIDs and logical channel IDs for respective MBS data bursts, service quality information, and an absolute start time of a service.

The ACR 130 transmits a service start response message to the MBS server 140 in response to the service start request message, in step S320. The ACR 130 changes only a GPRS tunneling protocol (GTP) Tunnel ID to be used between the RAS 120 and the ACR 130 in the service start request message received from the MBS server 140, and delivers the service start request message to the RAS 120, in step S330. At this time, other parameters included in the service start request message have not been changed.

The RAS 120 registers the received multicast CID with the corresponding MBS zone and transmits the service start response message to the ACR 130, in step S340.

The ACR 130 transmits the service start response message to the MBS server 140, in step S350.

When it receives the service start response message from the ACR 130, the MBS server 140 transmits MBS data packets to the RAS 120 through the ACR 130, in steps S360 and S370. In this case, the MBS data packets are formed of information for synchronization between the plurality of RASs 120 and MBS data bursts so as to achieve a macro diversity effect. In addition, the MBS data packets are formed of information for transmitting of the MBS data packets.

When the MBS server 140 transmits the MBS data packets, new MBS burst data may be generated or deleted. Since any change in the MBS burst data must be applied to bearer resource allocation between nodes, addition and deletion of the MBS burst data must be reported to the ACR 130 and the RAS 120. Such an exemplary embodiment will now be described in further detail with reference to FIG. 4 to FIG. 6.

FIG. 4 to FIG. 6 respectively show a process for providing an MBS in a communication system according to second to fourth exemplary embodiments of the present invention. FIG. 4 shows addition of MBS burst data, and FIG. 5 shows deletion of MBS burst data. In addition, FIG. 6 shows termination of an MBS.

As shown in FIG. 4, the MBS server 140 transmits a service add request message to the ACR 130 in step S140. In this case, the service add request message includes an MBS zone ID, a GTP Tunnel ID to be used for transmitting/receiving an MBS data packet to/from another node, a multicast CID to be added, a logical channel ID, service quality information for each of added MBS data bursts, and an absolute start time of an MBS.

The ACR 130 transmits a service add response message to the MBS server 140 in response to the service add request message in step S420, changes only the GTP Tunnel ID in the service add request message received from the MBS server 130, and delivers the service add request message to the RAS 120, in step S430. At this time, other parameters in the service add request message have not been changed.

The RAS 120 transmits the service add response message to the ARC 130 in response to the service add request message, in step S440.

The ACR 130 transmits the service add response message to the MBS server 140, in step S450.

When it receives the service add response message from the ACR 130, the MBS server 140 transmits MBS data packets, including MBS data packets to be added, to the RAS 120 through the ACR 130, in step S460 and S470.

When an MBS data burst is detected when the MBS server 140 provides an MBS, as shown in FIG. 5, the MBS server 140 transmits a service delete request message to the ACR 130 in step S510. In this case, the service delete request message includes an MBS zone ID, a GTP Tunnel ID to be used for transmitting/receiving an MBS data packet to/from another node, a multicast CID and a logical channel ID to be terminated, and an absolute end time of each MBS data burst.

The ACR 130 transmits a service delete response message to the MBS server 140 in response to the service delete request message in step S520, changes only the GTP Tunnel ID in the service delete request message received from the MBS server 140, and delivers the service delete request message to the RAS 120 in step S530. At this time, other parameters in the service delete request message have not been changed.

The RAS 120 transmits the service delete response message to the ACR 130 in response to the service delete request message, in step S540.

The ACR 130 transmits the service delete response message to the MBS server 140, in step S550.

When it receives the service delete response message from the ACR 130, the MBS server 140 deletes the corresponding MBS data burst and transmits other MBS data packets to the RAS 120 to the ACR 130, in steps S560 and S570.

When an MBS data burst to be provided no longer exists, as shown in FIG. 6, the MBS server 140 transmits a service stop request message to the ACR 130, in step S610. The service stop request message includes an MBS zone ID and a GTP Tunnel ID.

When it receives the service stop request message, the ACR 130 transmits a service stop response message to the MBS server 140 in step S620, and delivers the service stop request message to the RAS 120 in step S630. When it receives the service stop request message, the RAS 120 transmits the service stop response message to the ACR 130 in step S640.

FIG. 7 shows a configuration of the MBS data packet.

As shown in FIG. 7, the MBS data packet includes an IP header 710, a generic routing encapsulation (GRE) header 720, and a data region 730. The IP header 710 includes an IP address, and the GRE header 720 includes a Tunnel ID for connection with another node. The data region 730 includes MBS MAP Message Frame Time, MBS Zone ID, Next MBS MAP Change indication, No. of Multicast CID, List of Multicast CID, OFDMA Symbol offset, No. OFDMA symbols, No. Subchannels, Next MBS frame offset and Next MBS OFDMA symbol offset, and Next MBS No. OFDMA symbols and Next MBS No. OFDMA subchannels. The MBS MAP Message Frame Time indicates an absolute time for loading an MBS MAP message that includes a location where the PSS (110 of FIG. 1) provided with an MBS receives an MBS data burst and information for decoding the MBS data burst. The MBS Burst Frame Offset indicates a frame location of the MBS data burst. The Next MBS MAP Change indication indicates whether the size of an MBS MAP message to be loaded in the next MBS frame has been changed. The No. of Multicast CID indicates multicast identifier information. The OFDMA Symbol offset indicates a start offset of an MBS data burst region. The No. OFDMA symbols and No. Subchannels indicate the size of the MBS data burst region. The Next MBS frame offset and Next MBS OFDMA symbol offset indicate an offset of an MBS MAP message to be loaded in the next MBS frame. The Next MBS No. OFDMA symbols and Next MBS No. OFDMA subchannels indicate the size of the MBS MAP message to be loaded in the next MBS frame when the Next MBS MAP Change indication is predetermined to be 1.

The above-described exemplary embodiments of the present invention may be realized by an apparatus and a method, but may also be realized by a program that realizes functions corresponding to configurations of the exemplary embodiments or a recording medium that records the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A service providing method for a plurality of radio access systems (RASs) to respectively provide a multicast broadcast service (MBS) provided from a (MBS) server to a portable subscriber station (PSS) in a communication system, the service providing method comprising:
   processing a signal for establishing a bearer with the MBS server;
   receiving a multicast broadcast data packet from the MBS server, the multicast broadcast data packet including information for synchronization of the respective RASs and broadcast data; and
   transmitting the multicast broadcast data packet to the PSS by using the synchronization information.

2. The service providing method of claim 1, wherein the synchronization information comprises MBS MAP message frame time information that indicates a time for loading an MBS MAP message and MBS burst frame offset information that indicates a frame location of the broadcast data, the MBS MAP message indicating a location and the size of the broadcast data.

3. The service providing method of claim 2, further comprising,
when an MBS provided from the MBS server is changed:
receiving information on the change from the MBS server; and
receiving a multicast broadcast data packet to which the change information is applied and transmitting the received multicast broadcast data packet to the PSS.

4. The service providing method of claim 3, wherein the change in the MBS comprises addition or deletion of the broadcast data.

5. The service providing method of claim 1, further comprising,
when an MBS provided from the MBS server is changed, receiving information on the change from the MBS server; and
receiving a multicast broadcast data packet to which the change information is applied and transmitting the received multicast broadcast data packet to the PSS.

6. The service providing method of claim 5, wherein the change in the MBS comprises addition or deletion of the broadcast data.

7. A method for a multicast broadcast service (MBS) server to provide an MBS to a plurality of radio access systems (RASs) in a communication system, the method comprising:
allocating connection resources for transmitting multicast broadcast data packets to the plurality of RASs; and
transmitting the multicast broadcast data packets, each including synchronization information between the plurality of RASs and broadcast data, to the plurality of RASs.

8. The method of claim 7, wherein the synchronization information comprises MBS MAP frame time information that indicates a time for loading an MBS MAP message and MBS burst frame offset information that indicates a location of the broadcast data, the MBS MAP message including information on a location and the size of the broadcast data.

9. The method of claim 8, wherein the connection resource comprises service quality information and start time information of the MBS.

10. The method of claim 9, wherein the MBS server is located in a packet access router that manages the plurality of RASs.

11. The method of claim 9, wherein the MBS server is connected to a packet access router that manages the plurality of RASs.

12. A method for a multicast broadcast service (MBS) server to provide an MBS to a plurality of radio access systems (RASs) in a communication system, the method comprising:
dividing the plurality of RASs into a plurality of groups according to locations; allocating identifiers (IDs) for respective groups and connection resources to the plurality of RASs for transmitting multicast broadcast data packets to the plurality of RASs; and
transmitting the multicast broadcast data packets including synchronization information between RASs in each group to the plurality of RASs and broadcast data to the plurality of RASs.

13. The method of claim 12, wherein the synchronization information comprises MBS MAP frame time information that indicates a time for loading an MBS MAP message and MBS burst frame offset information that indicates a location of the broadcast data, the MBS MAP message including information on a location and the size of the broadcast data.

14. The method of claim 13, wherein the connection resource comprises service quality information and start time information of the MBS.

15. The method of claim 14, wherein the MBS server is located in a packet access router that manages the plurality of RASs.

16. The method of claim 14, wherein the MBS server is connected to a packet access router that manages the plurality of RASs.

* * * * *